United States Patent
Fink et al.

(10) Patent No.: US 10,089,506 B1
(45) Date of Patent: *Oct. 2, 2018

(54) SYSTEM AND SENSOR FOR RFID-ENABLED INFORMATION COLLECTION

(71) Applicant: The United States of America as represented by the Administrator of the National Aeronautics and Space Administration, Washington, DC (US)

(72) Inventors: Patrick W. Fink, Missouri City, TX (US); Gregory Y. Lin, Houston, TX (US); Timothy F. Kennedy, Houston, TX (US); Phong H. Ngo, Friendswood, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/697,927

(22) Filed: Sep. 7, 2017

Related U.S. Application Data (63) Continuation of application No. 14/993,658, filed on Jan. 12, 2016, now Pat. No. 9,760,750.

(51) Int. Cl.
*G06F 13/42* (2006.01)
*G06K 7/10* (2006.01)

(52) U.S. Cl.
CPC ............................. *G06K 7/10316* (2013.01)

(58) Field of Classification Search
CPC ................................................. G06K 7/10316
USPC ........................................................ 340/903
See application file for complete search history.

(56) References Cited

U.S. PATENT DOCUMENTS

| | | | |
|---|---|---|---|
| 6,184,818 B1 | 2/2001 | Meinel | |
| 6,189,727 B1 | 2/2001 | Shoenfeld | |
| 6,269,285 B1 | 7/2001 | Mignault | |
| 6,539,280 B1 | 3/2003 | Valiulis et al. | |
| 6,684,126 B2 | 1/2004 | Omura et al. | |
| 6,752,277 B1* | 6/2004 | Sempliner | A47F 1/126 |
| | | | 211/1.57 |
| 7,113,125 B2 | 9/2006 | Le Sesne | |
| 7,644,889 B2 | 1/2010 | Johnson | |

(Continued)

*Primary Examiner* — Santiago Garcia
(74) *Attorney, Agent, or Firm* — Kurt G. Hammerle; Edward K. Fein; Mark P. Dvorscak (57) ABSTRACT

A system and sensor provides for radio frequency identification (RFID)-enabled information collection. The system includes a ring-shaped element and an antenna. The ring-shaped element includes a conductive ring and an RFID integrated circuit. The antenna is spaced apart from the ring-shaped element and defines an electrically-conductive path commensurate in size and shape to at least a portion of the conductive ring. In an alternate embodiment, the sensor system further comprises a reference ring-shaped element in a fixed relationship with respect to the antenna, with the reference ring-shaped element defining another series circuit to include an electrically-conductive reference ring and a reference RFID integrated circuit. The system may include an interrogator for energizing the ring-shaped element and receiving a data transmission from the RFID integrated circuit that has been energized for further processing by a processor.

22 Claims, 7 Drawing Sheets

(56) References Cited

U.S. PATENT DOCUMENTS

| | | | |
|---|---|---|---|
| 8,260,456 B2* | 9/2012 | Siegel | G06Q 10/08 221/4 |
| 8,401,697 B2 | 3/2013 | Templer et al. | |
| 8,695,878 B2 | 4/2014 | Burnside et al. | |
| 8,712,585 B2 | 4/2014 | Bruck et al. | |
| 8,812,378 B2 | 8/2014 | Swafford et al. | |
| 8,933,789 B1 | 1/2015 | Fink et al. | |
| 9,031,689 B1 | 5/2015 | Fink et al. | |
| 9,208,362 B1* | 12/2015 | Fink | H04W 4/008 |
| 2005/0017895 A1 | 1/2005 | Andersson | |
| 2006/0132351 A1 | 6/2006 | LeSesne | |
| 2006/0145863 A1 | 7/2006 | Martin et al. | |
| 2007/0035380 A1* | 2/2007 | Overhultz | G06Q 10/087 340/5.9 |
| 2007/0254080 A1 | 11/2007 | Schackmuth et al. | |
| 2007/0268139 A1 | 11/2007 | Sweeney | |
| 2009/0085751 A1* | 4/2009 | Sakama | G06K 19/04 340/572.7 |
| 2010/0060457 A1* | 3/2010 | Burnside | H01Q 1/2216 340/572.7 |
| 2011/0100507 A1* | 5/2011 | Weitzhandler | B60K 15/04 141/94 |
| 2011/0240731 A1* | 10/2011 | Lee | G06Q 30/06 235/375 |
| 2012/0091162 A1* | 4/2012 | Overhultz | A47F 1/126 221/1 |
| 2013/0048724 A1* | 2/2013 | Burnside | G06Q 10/087 235/385 |
| 2014/0187160 A1* | 7/2014 | Prencipe | H04W 4/008 455/41.2 |
| 2014/0306807 A1* | 10/2014 | Rowland | H04Q 9/00 340/10.3 |
| 2014/0312123 A1* | 10/2014 | Lin | G06K 19/07754 235/492 |
| 2015/0136858 A1* | 5/2015 | Finn | G06K 19/07754 235/492 |
| 2015/0278675 A1* | 10/2015 | Finn | G06K 19/07783 235/492 |
| 2016/0171201 A1* | 6/2016 | Schroder | H04B 5/0031 726/20 |
| 2016/0232386 A1* | 8/2016 | Sehmer | G06K 7/10316 |
| 2017/0164878 A1* | 6/2017 | Connor | A61B 5/14532 |

* cited by examiner

SYSTEM AND SENSOR FOR RFID-ENABLED INFORMATION COLLECTION

CROSS-REFERENCE TO RELATED PATENT APPLICATION(S)

This patent application claims the benefit of and priority to U.S. Provisional Patent Application Ser. No. 62/102,352, filed Jan. 12, 2015, the contents of which are hereby incorporated by reference in their entirety. This application is also a continuation of U.S. patent application Ser. No. 14/993,658, now U.S. Pat. No. 9,760,750.

This patent application is related to U.S. Pat. Nos. 8,933,789 and 9,031,689, the contents of which are hereby incorporated by reference in their entirety.

ORIGIN OF THE INVENTION

The invention described herein was made by employees of the United States Government and may be manufactured and used by or for the Government of the United States of America for governmental purposes without the payment of any royalties thereon or therefor.

FIELD OF THE INVENTION

The present invention relates generally to radio frequency identification (RFID) sensor systems, and more particularly to a system for RFID-enabled information collection that can include position information.

BRIEF SUMMARY OF THE INVENTION

The present invention is a system for radio frequency identification (RFID)-enabled information collection. In one embodiment, a plurality of ring-shaped elements are arrayed linearly in a spaced apart fashion in a plane. Each ring-shaped element includes an electrically-conductive ring and an RFID integrated circuit electrically coupled to the electrically-conductive ring. An antenna is coupled to a movable support for movement therewith. The antenna defines an electrically-conductive path commensurate in size and shape to at least a portion of the electrically-conductive ring. An interrogator transmits a signal to the antenna wherein electric current is generated along its electrically-conductive path and electromagnetic energy emanates from the antenna. At least one of the ring-shaped elements and the RFID integrated circuit associated therewith is energized by the electromagnetic energy. Each RFID integrated circuit so-energized generates a data transmission for receipt by the interrogator. A processor coupled to the interrogator derives information related to position of the movable support using the data transmission.

In another embodiment described herein, a plurality of identical ring-shaped elements are arrayed linearly in a spaced apart fashion in a plane. Each ring-shaped element defines a series circuit to include an electrically-conductive rectangular ring and an RFID integrated circuit. An antenna is coupled to a movable support for movement therewith. The antenna defines an electrically-conductive path commensurate in size and shape to at least a portion of the rectangular ring. The path is parallel to the plane containing the ring-shaped elements. An interrogator transmits a signal to the antenna wherein electric current is generated along its path and electromagnetic energy emanates from the antenna. At least one of the ring-shaped elements and the RFID integrated circuit associated therewith is energized by the electromagnetic energy. Each RFID integrated circuit so-energized generates a data transmission for receipt by the interrogator. A processor coupled to the interrogator derives information related to position of the movable support using the data transmission.

Another embodiment described herein is a sensor system for radio frequency identification (RFID)-enabled information collection. A ring-shaped element includes an electrically-conductive ring and an RFID integrated circuit electrically coupled to the electrically-conductive ring. An antenna spaced apart from the ring-shaped element defines an electrically-conductive path commensurate in size and shape to at least a portion of the electrically-conductive ring.

Yet another embodiment described herein is a sensor system for radio frequency identification (RFID)-enabled information collection. A ring-shaped element lying in a plane defines a series circuit to include an electrically-conductive rectangular ring and an RFID integrated circuit. An antenna spaced apart from the ring-shaped element defines an electrically-conductive path commensurate in size and shape to at least a portion of the rectangular ring. The path is parallel to the plane containing the ring-shaped element.

These and other embodiments of the present invention will be further understood and appreciated by those skilled in the art by reference to the following specification, claims, and appended drawings.

DETAILED DESCRIPTION OF THE INVENTION

Figure 1:
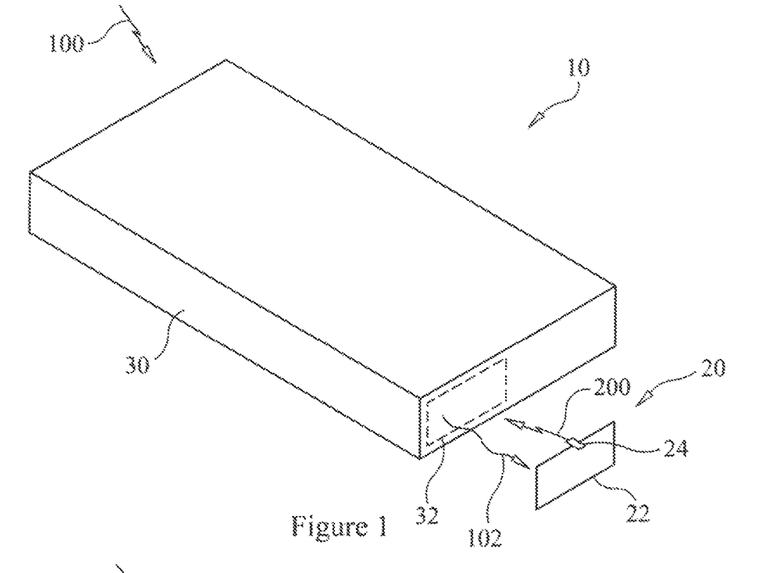
FIG. 1 is a schematic view of a sensor system for radio frequency identification (RFID)-enabled information collection in accordance with an embodiment of the present invention.

Referring now to the drawings, and more particularly to FIG. 1, a sensor system for radio frequency identification (RFID)-enabled information collection is shown and is referenced generally by numeral 10. Sensor system 10 can be used in a variety of sensing modalities including, but not limited to, sensing the distance between two objects, the state of proximity between two objects (e.g., whether a drawer of an enclosure is open or closed, whether an item has been removed from an enclosure, etc.) strain, weight, pressure, mass, and orientation. Sensor system 10 can also be the basic sensing element of an information collection system. For example and as will be described further below, sensor system 10 can be the base sensing element for a position indicating system or an inventory monitoring system working in conjunction with product dispensers.

Sensor system 10 includes a ring-shaped element 20 and an antenna 30 spaced apart from ring-shaped element 20. The spacing between element 20 and antenna 30 can be fixed or variable depending on the goals of the particular sensing application. Ring-shaped element 20 includes an electrically-conductive ring 22 (e.g., wire, conductive trace, etc.) and an RFID integrated circuit 24 electrically coupled or connected with ring 22. In general, RFID integrated circuit 24 is an RFID element that can be energized by electromagnetic energy and generate a transmission indicative of data (e.g., unique identity data) once energized, as may be known by those having ordinary skill in the art and the benefit of this detailed description. In the illustrated example, ring-shaped element 20 is a series electrical circuit that includes ring 22 and RFID integrated circuit 24. Further, ring 22 is rectangular and lies in a plane. For example, ring-shaped element 20 could be fabricated on a planar substrate (not shown) such as a printed circuit board or other substrate without departing from the scope of the present invention.

Antenna 30 is any of a variety of antennas that, when in receipt of a signal for which it is tuned, supports electric current along an electrically-conductive path whose shape and size are commensurate with some or all of the shape/size of ring 22. For example, in the illustrated embodiment, the electrically-conductive path should be a rectangular or some portion thereof whose size/shape mirrors that of ring 22 or some portion thereof. The electrically-conductive path is defined along some or all of the dashed-line rectangle referenced by numeral 32. Suitable choices for antenna 30 include, but are not limited to, microstrip patch antennas (e.g., quarter wave, half wave, etc.), slot antennas, dipole antennas, and planar inverted-F antennas (PIFA). In general, when antenna 30 receives a signal 100 (from an RFID interrogator not shown in FIG. 1) for which antenna 30 is tuned, electric current travels along some or all of path 32 and antenna 30 emanates electromagnetic energy as indicated by wavy-lined arrow 102. Electromagnetic energy 102 couples to ring-shaped element 20 thereby energizing the operation of RFID integrated circuit 24. Once energized, RFID integrated circuit 24 generates a transmission back to the RFID interrogator (not shown in FIG. 1 but shown generally in FIG. 3) through antenna 30 via an RF signal 200. Generally speaking, the transmission from an energized RFID integrated circuit 24 contains "data" where such data can include one or more of stored identity data associated with RFID integrated circuit 24, sensed-condition data, inherent-condition data provided by the magnitude and/or phase associated with signal 200, etc. Coupling of electromagnetic energy 102 to ring-shaped element 20 is generally stronger when path 32 lies in a plane that is parallel to the plane containing ring-shaped element 20 and when path 32 aligns with the ring-shaped element. More generally, power transfer of energy 102 to ring-shaped element 20 is optimized when ring 22 enables a conjugate impedance match with the impedance of RFID integrated circuit 24. The prescribed positioning of the ring along the antenna's current path facilitates this conjugate impedance match. Attainment of the conjugate impedance match may require elongation of the ring, broadening it, meandering it, or aligning it with certain portions of path 32 known to support stronger or weaker currents. Thus, it is to be understood that the ring may not be fully parallel to the path of the current on the antenna in order to achieve to the optimal match.

Figure 2:
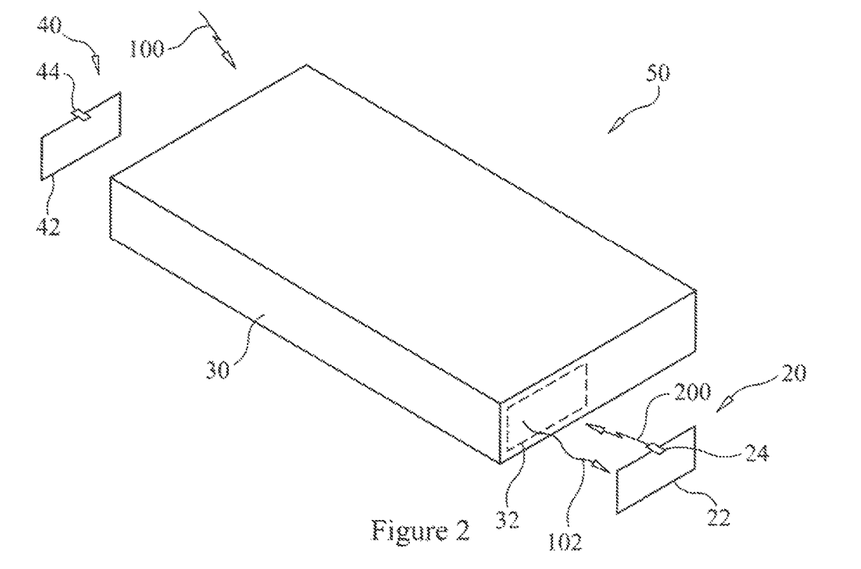
FIG. 2 is a schematic view of a sensor system for RFID-enabled information collection in accordance with another embodiment of the present invention.

Referring now to FIG. 2, another sensor system 50 includes the elements of sensor system 10 and further includes a reference ring-shaped element 40 positioned/configured to be in a fixed relationship to antenna 30. Element 40 includes an electrically-conductive ring 42 and an RFID integrated circuit 44 such that element 40 matches the configuration, size, and shape of ring-shaped element 20. Ring-shaped element 40 provides for calibration of sensor system 50 as well as providing a reference output (when energized) that can be used when evaluating the data associated with signal 200 transmitted by ring-shaped element 20. For example, the strength/magnitude and phase of the signal received from ring-shaped element 20 can be compared to the strength/magnitude and phase of the signal received from the fixed position of reference ring-shaped element 40 in order to estimate the position and orientation of ring-shaped element 20.

As mentioned above, the exemplary sensor system 10 or sensor system 50 can serve as the building block of an information collection system such as a position indicating system or an inventory monitoring system. Several examples of such systems will be described below with the aid of FIGS. 3-6. In each embodiment, data is transmitted from one or more ring-shaped elements in the same fashion as described above.

Figure 3:
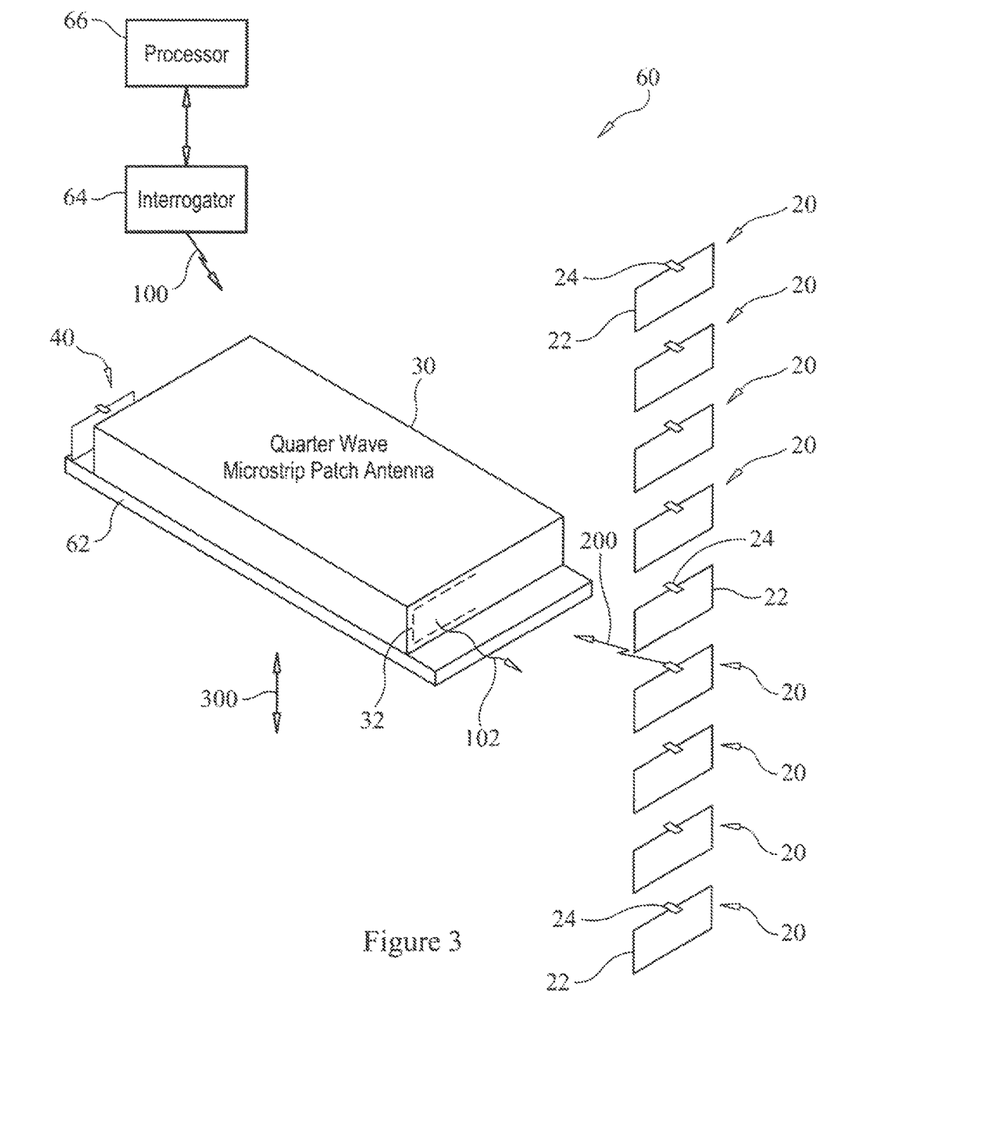
FIG. 3 is a schematic view of a system for RFID-enabled information collection in accordance with an embodiment of the present invention.

Referring first to the embodiment illustrated in FIG. 3, a position indicating system 60 includes a plurality of ring-shaped elements 20 that are arranged linearly and spaced-apart from one another in a plane. In one embodiment, all of the plurality of ring-shaped elements 20 are identical to one another in size and/or shape. In another example, all of ring-shaped elements 20 can be affixed to common planar substrate (not shown) such that all elements 20 lie in a common plane. Each of ring-shaped elements 20 includes an electrically-conductive ring 22 and an RFID integrated circuit 24 as described above. Each RFID integrated circuit 24 has a unique identity associated therewith where the unique identity is transmitted therefrom when circuit 24 is energized, Antenna 30 is mounted on a movable support 62 where such movement is indicated by two-headed arrow 300 such that movement 300 results in corresponding movement of antenna 30. A reference ring-shaped element 40 can also be mounted on movable support 62 and used to facilitate calibration and/or provide reference data.

In the illustrated embodiment, antenna 30 is a shorted quarter wave microstrip patch antenna configured and oriented such that a current path 32 is sized/shaped to match a portion of each ring 22 and lie in a plane that is parallel to the plane containing ring-shaped elements 20. For example, in terms of a shorted quarter wave microstrip patch antenna, path 32 is defined at either end of the antenna that includes conductive edges of the top and bottom faces of the antenna and the edge of the conductive face of the antenna used to short the top and bottom faces as will be explained further below. System 60 also includes an interrogator 64 and a processor 66 located remotely with respect to movable support 62 and antenna 30. Interrogator 64 transmits signal 100 that is received by antenna 30. As a result and as described above, electric current along path 32 causes electromagnetic energy 102 to emanate from antenna 30. Electromagnetic energy 102 coupled to one or more of ring-shaped elements 20 causes the energized ones thereof to transmit data via signal 200 that, in turn, is coupled to interrogator 64 through antenna 30. The one or more received signals 200 are received by interrogator 64 and processed by processor 66. The one of ring-shaped elements 20 that is closest to antenna 30 will yield the strongest signal 200. Because each of RFID integrated circuits 24 has a unique identity transmitted in its signal 200, the strongest signal 200 is indicative of the position of antenna 30 relative to the array of ring-shaped elements 20.

Figure 4:
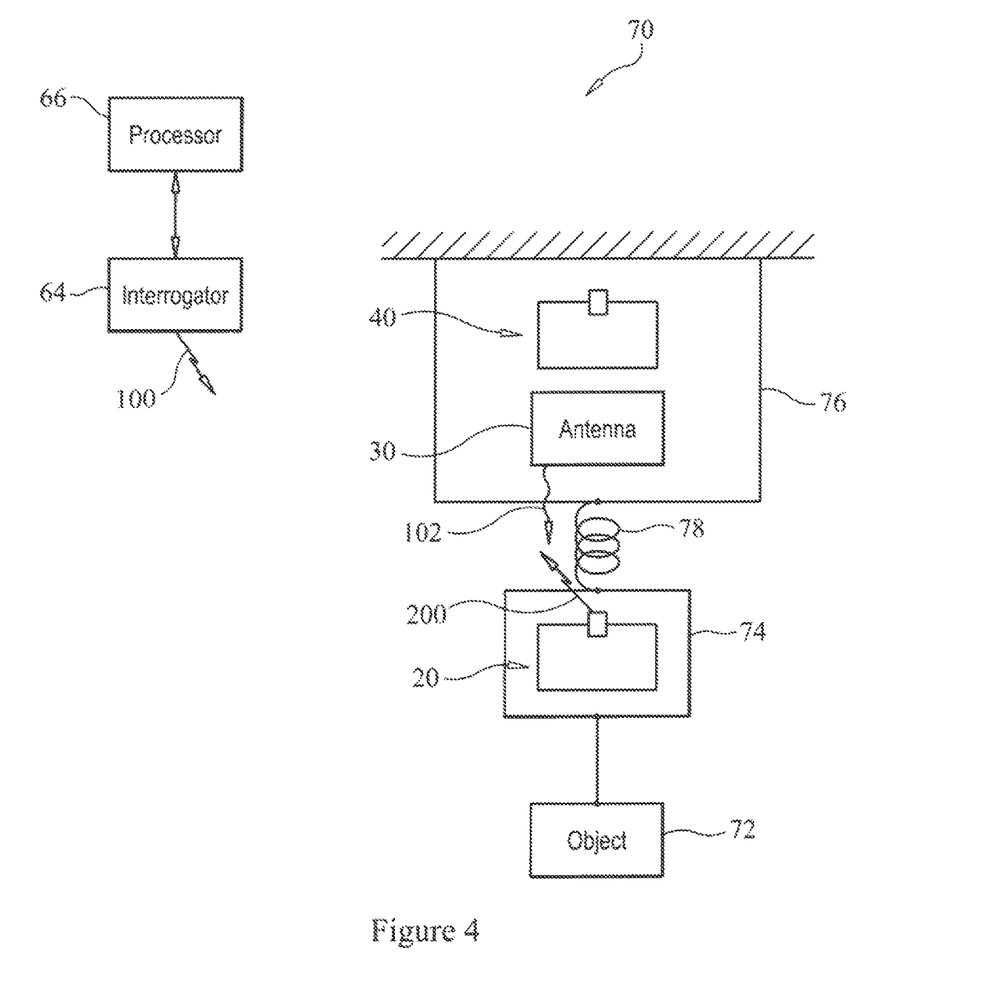
FIG. 4 is a schematic view of a system for RFID-enabled information collection in accordance with another embodiment of the present invention.

FIG. 4 illustrates another system embodiment of the present invention that is referenced generally by numeral 70. System 70 is a means for measuring the mass of an object 72 attached to or hanging from a movable support 74 on which a single ring-shaped element 20 is mounted. Support 74 is suspended from a fixed body 76 via a spring 78 or other elastic element. Mounted on fixed body 76 is antenna 30 and reference ring-shaped element 40. System 70 also includes interrogator 64 and processor 66. Ring-shaped element 20, antenna 30, reference ring-shaped element 40, interrogator 64, and processor 66 function as described previously herein. In operation, interrogator 64 receives a received signal strength indication (i.e., RSSI) from each of ring-shaped element 20 and reference ring-shaped element 40. The difference between the two RSSI readings can be used to estimate the mass of object 72 since the object's mass changes the distance between ring-shaped element 20 and antenna 30, while the distance between reference ring-shaped element 40 and antenna remains fixed at all times.

Figure 5:
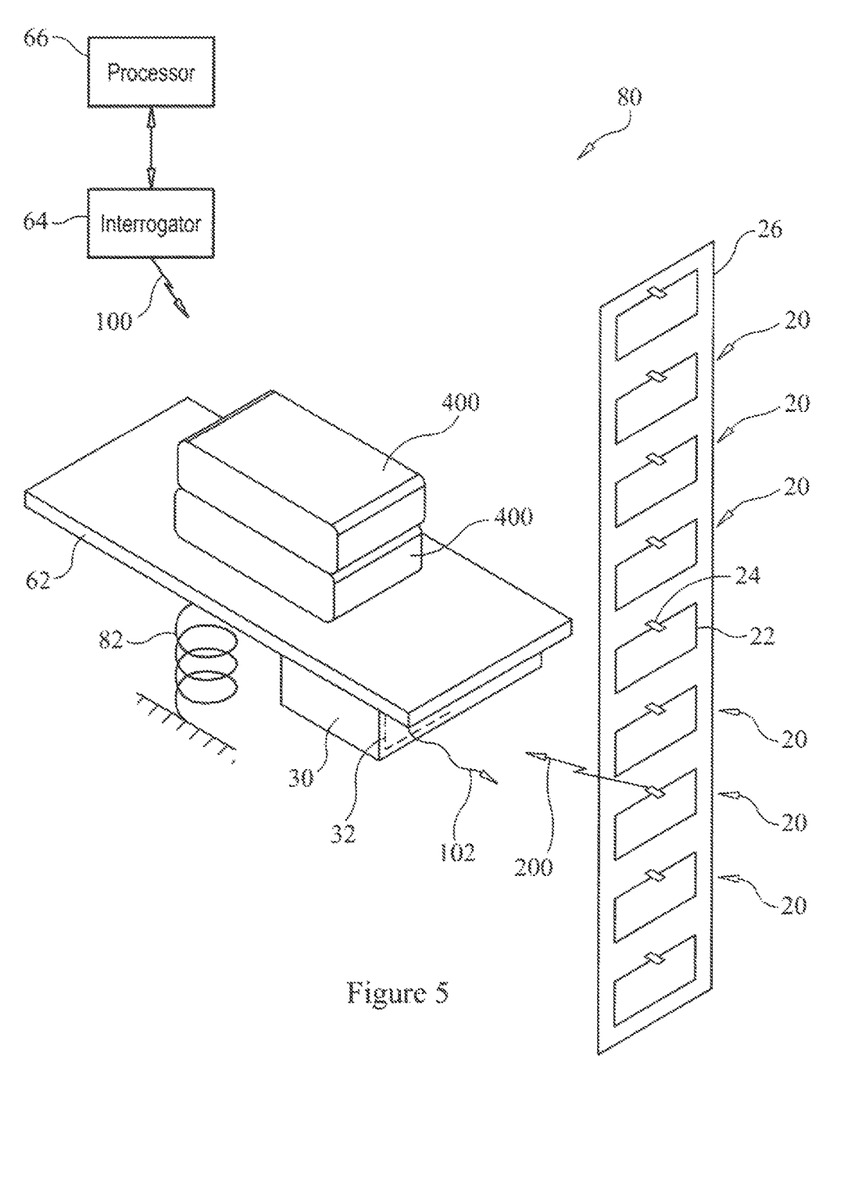
FIG. 5 is a schematic view of a pusher-type product dispenser system including RFID-enabled inventory monitoring in accordance with an embodiment of the present invention.
Figure 6:
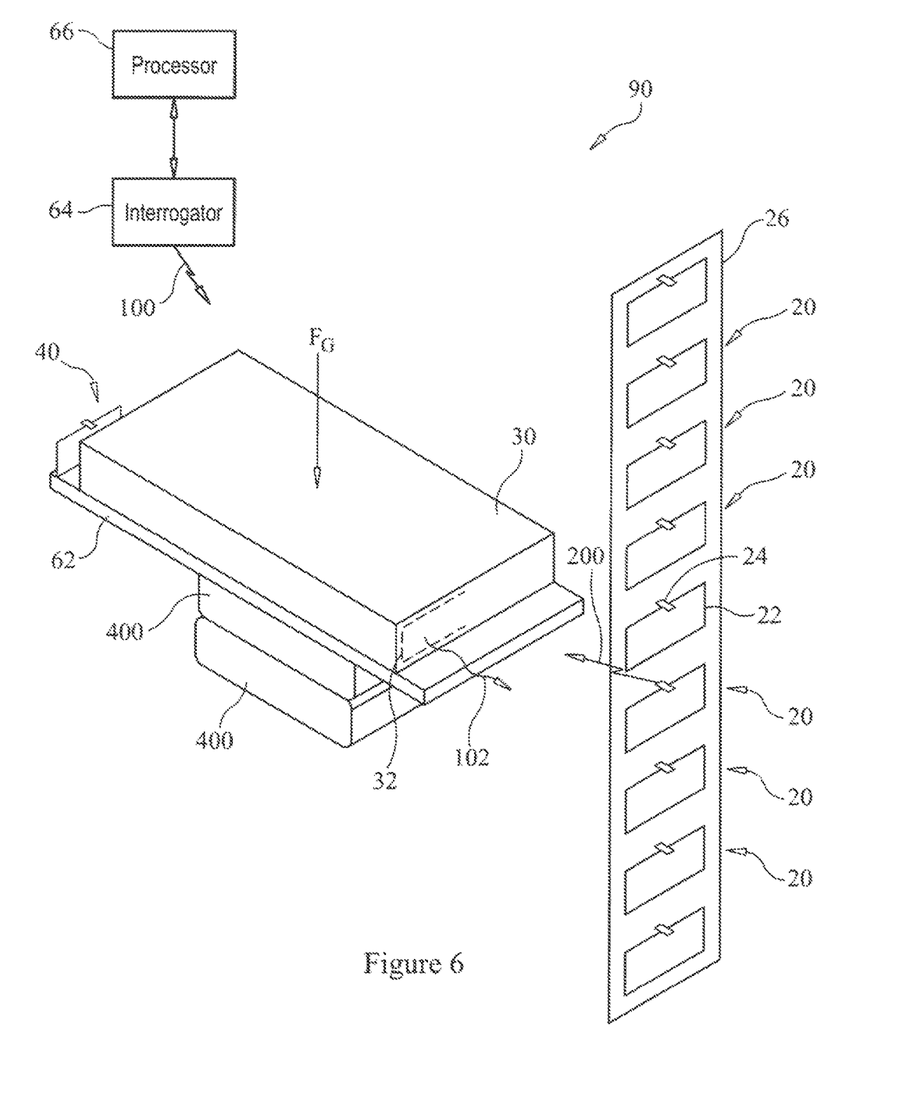
FIG. 6 is a schematic view of a gravity-type product dispenser system including RFID-enabled inventory monitoring in accordance with still another embodiment of the present invention.

FIGS. 5 and 6 illustrate inventory monitoring systems constructed using the principles described herein. Referring first to FIG. 5, a pusher-type product dispenser has the above-described RFID-enabled information collection system incorporated therewith where the combination is referenced generally by numeral 80. For clarity of illustration, only those elements of a pusher-type product dispenser used by the present invention are illustrated. Identical reference numerals are used for those elements previously-described herein. In system 80, movable support 62 is the pusher plate of a pusher-type product dispenser. Support 62 is acted upon on one side thereof by an elastic force provided by, for example, a spring 82 (e.g., coil spring, elastic band, or any other elastic elements/system that can perform the functions of a spring). Support 62 is acted upon on the other side thereof by the opposing force (e.g., the weight) of a stack of one or more products 400. Each time one of products 400 is removed, which as shown in the vertical arrangement of FIG. 5 would be a product 400 near the top of the stack, support 62 is pushed under the force of spring 82 so that the next one of products 400 is readily accessible. Such pusher-type dispensers can be arranged vertically as shown in FIG. 5, horizontally, or at any angle without departing from the scope of the present invention. The linear array of ring-shaped elements 20 are positioned on a support substrate 26 adjacent to the line or route of travel associated with support 62. Antenna 30 is mounted on support 62 as previously described herein. A reference ring-shaped element (not shown) such as reference ring-shaped element 40 described herein can also be mounted on support 62 in a fixed relationship to antenna 30. Interrogator 64 and processor 66 operate as described above to determine the position of support 62/antenna 30 that is indicative of the number of products 400 remaining at any given time. Interrogator 64 and processor 66 can be fixed in their positions or contained, for example, in a hand-held or robotic device.

The structure of system 80 illustrated in FIG. 5 can also be used to implement a scale system in which gravity acting upon the mass of one or more items 400 causes a force to compress spring 82 to bring about movement of support 62 and antenna 30. Interrogator 64 and processor 66 can be configured to estimate the mass or weight of the one or more items 400 based on the received identification numbers, signal strength, and signal phase from one or more ring-shaped elements 20. System 80 can also be representative of a dispenser in which the number of items remaining can be inferred from the mass.

FIG. 6 illustrates a gravity-type product dispenser that has the above-described RFID-enabled information collection system incorporated therewith where the combination is referenced generally by numeral 90. Once again, only those elements of a gravity-type product dispenser used by the present invention are illustrated. In system 90, movable support 62 with antenna 30 mounted thereon is positioned on top of a stack of products 400 where the next one of products 400 that is to be removed is located at the bottom of the stack. Accordingly, in terrestrial applications of system 90, the force of gravity $F_G$ causes the movement of support 62 whenever one of products 400 is removed from the bottom of the stack or from some position within the stack. The position of support 62 is determined as has been previously described herein where such position is indicative of the number of products 400 remaining in the stack. In each of the embodiments illustrated in FIGS. 5 and 6, a reference ring-shaped element 40 can be mounted on movable support 62 (as illustrated in FIG. 6) and used to facilitate calibration and/or provide reference data as previously described herein.

Figure 7:
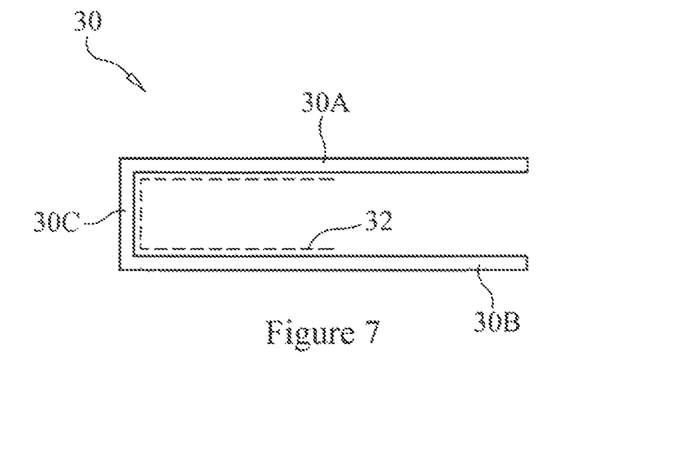
FIG. 7 is a side view of a quarter wave microstrip patch antenna that can be used in an embodiment of the present invention.
Figure 8:
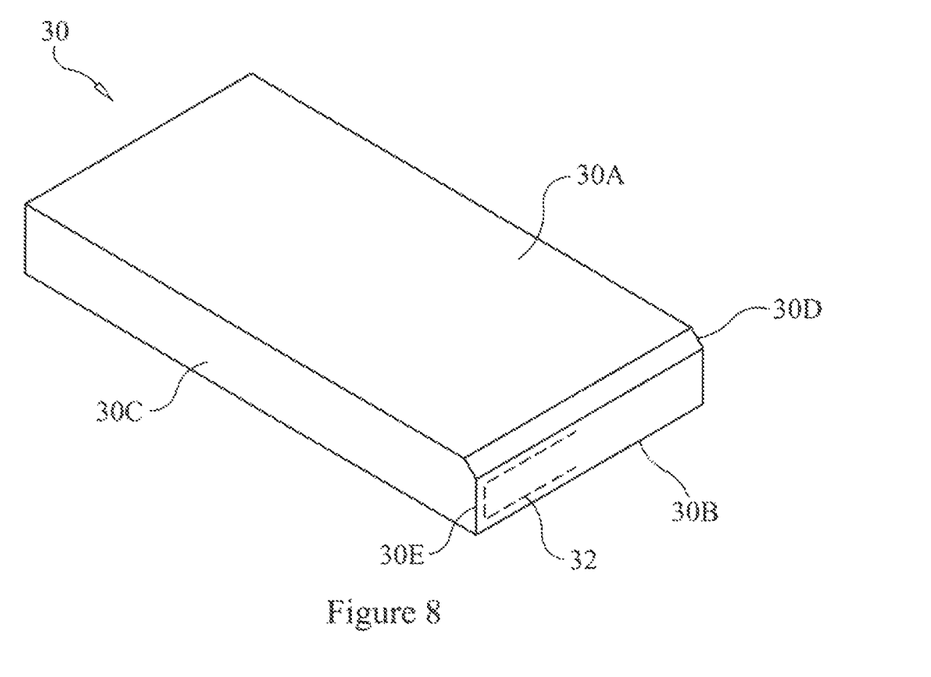
FIG. 8 is a perspective view of a modified quarter wave microstrip patch antenna that can be used in an embodiment of the present invention.
Figure 9:
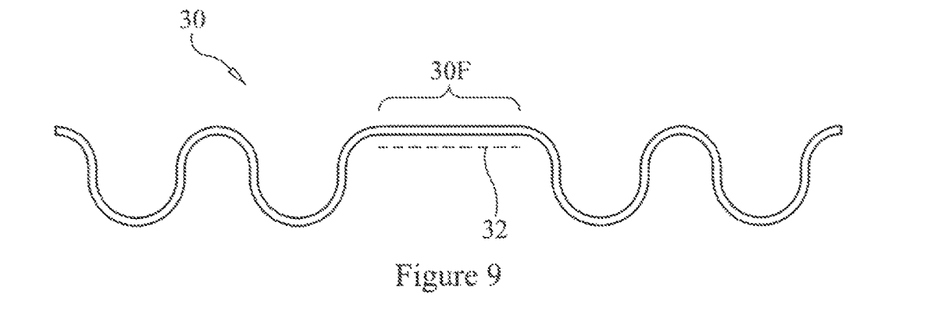
FIG. 9 is a side view of a meandering half wave dipole antenna that can be used in an embodiment of the present invention.
Figure 10:
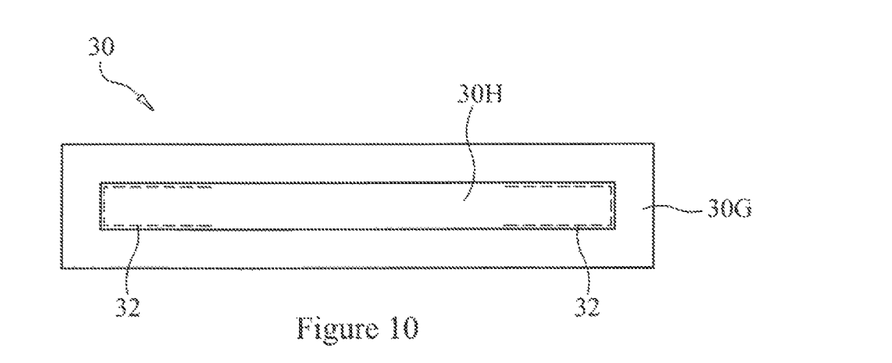
FIG. 10 is a side view of a slot antenna that can be used in an embodiment of the present invention.
Figure 11:
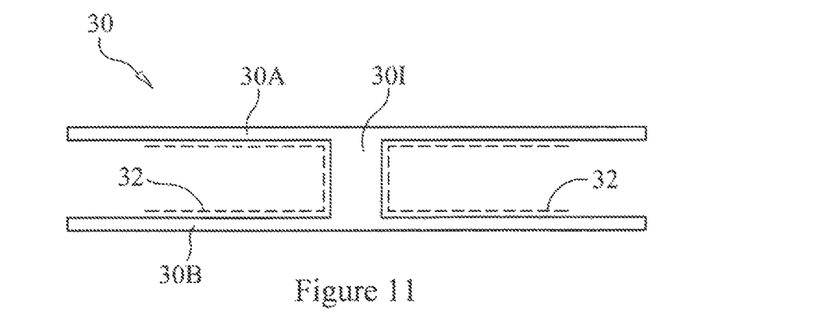
FIG. 11 is an end view of a planar inverted-F antenna that can be used in an embodiment of the present invention.

As mentioned above, the present invention can use a variety of antennas for the above-described antenna 30. In general, such antennas include microstrip patch antennas, dipole antennas, slot antennas, and planar inverted-F antennas (PIFA). Several exemplary antennas are shown in FIGS. 7-11, wherein a portion 32 of an electrically-conductive path defined by the antenna is illustrated therewith. As described above, path portion 32 (or simply "path" hereinafter) is commensurate in size and shape to at least a portion of the ring shaped element that will be used in conjunction with the antenna. In FIG. 7, a side view of a quarter wave microstrip patch antenna 30 illustrates that the antenna has spaced-apart top and bottom surface conductors 30A and 30B, respectively, shorted together along one edge thereof by a shorting back conductor 30C. Because current is strongest at the shorted end of the antenna, the antenna can be positioned such that path 32 (that is to align with a ring-shaped element 20) is at the shorted end. Note that path 32 is created at either end of the antenna thereby supporting the antenna's interrogation of a reference ring-shaped element 40 as described earlier herein. In FIG. 8, a modified quarter wave microstrip patch antenna 30 has spaced-apart top and bottom surface conductors 30A and 30B, respectively, and a shorting back conductor 30C. A chamfered face conductor 30D angles downward from top surface 30A towards bottom surface 30B to thereby define a shorter-length shorting conductor edge 30E as compared to a quarter wave microstrip patch antenna without a chamfered face conductor. Path 32 is at the shorted end as in the previous example. Chamfered face conductor 30D allows a greater spacing between surface conductors 30A and 30B for impedance matching and bandwidth purposes, while also providing for the use of a shorter conductor edge 30E for closer ring spacing and hence improved resolution. In FIG. 9, a meandering half wave dipole antenna 30 has a straight center portion 30F where current is stronger than at the ends of the dipole. Accordingly, this type of antenna would be positioned such that center portion 30F defines path 32 for purposes of the present invention. FIG. 10 illustrates a slot antenna 30 defined by a conductive portion 30G surrounding a non-conductive slot 30H. Currents are strongest at either end of slot 30H such that either end of slot 30H defines a path 32. Finally, FIG. 11 illustrates a PIFA 30 having spaced-apart top and bottom surface conductors 30A and 30B, respectively, and a shorting section 301 along a portion of one edge of surface conductors 30A and 30B. Currents are strongest along both sides of section 301 such that this region is included in two of path 32.

While some embodiments of the invention have been herein illustrated, shown and described, it is to be appreciated that various changes, rearrangements and modifications may be made therein, without departing from the scope of the invention as defined by the appended claims. It is intended that the specific embodiments and configurations are disclosed for practicing the invention, and should not be interpreted as limitations on the scope of the invention as defined by the appended claims and it is to be appreciated that various changes, rearrangements and modifications may be made therein, without departing from the scope of the invention as defined by the appended claims.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function and step-plus-function clauses are intended to cover the structures or acts described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed as new and desired to be secured by Letters Patent of the United States is:

1. A sensor system for radio frequency identification (RFID)-enabled information collection, comprising:
   a moveable support;
   a ring-shaped element including an electrically-conductive ring and an RFID integrated circuit electrically coupled to said electrically-conductive ring, the ring-shaped element being coupled to said moveable support for movement therewith; and
   an antenna spaced apart from said ring-shaped element, said antenna defining an electrically-conductive path commensurate in size and shape to at least a portion of said electrically-conductive ring.

2. The sensor system of claim 1, wherein said electrically-conductive path is parallel to said ring-shaped element.

3. The sensor system of claim 1, wherein said ring-shaped element is rectangular.

4. The sensor system of claim 1, wherein said antenna is selected from the group consisting of a microstrip patch antenna, a slot antenna, a dipole antenna, and a planar inverted-F antenna.

5. The sensor system of claim 1, further comprising a reference ring-shaped element in a fixed relationship with respect to said antenna, said reference ring-shaped element including an electrically-conductive reference ring and a reference RFID integrated circuit electrically coupled to said electrically-conductive reference ring.

6. A sensor system for radio frequency identification (RFID)-enabled information collection, comprising:
   a moveable substrate;
   a ring-shaped element lying in a plane of said moveable substrate and coupled thereto for movement with said substrate, said ring-shaped element defining a series circuit to include an electrically-conductive rectangular ring and an RFID integrated circuit;
   a fixed body; and
   an antenna coupled to said fixed body and spaced apart from said ring-shaped element, said antenna defining an electrically-conductive path commensurate in size and shape to at least a portion of said rectangular ring, said electrically-conductive path being parallel to said plane.

7. The system of claim 6, wherein said antenna is selected form the group consisting of a microstrip patch antenna, a slot antenna, a dipole antenna, and a planar inverted-F antenna.

8. The sensor system of claim 6, further comprising a reference ring-shaped element in a fixed relationship with respect to said antenna, said reference ring-shaped element defining another series circuit to include an electrically-conductive reference ring and a reference RFID integrated circuit.

9. A sensor system for radio frequency identification (RFID)-enabled information collection, comprising:
   a moveable support;
   a ring-shaped element including an electrically-conductive ring and an RFID integrated circuit electrically coupled to said electrically-conductive ring, the ring-shaped element being coupled to said moveable support for movement therewith;
   an antenna spaced apart from said ring-shaped element, said antenna defining an electrically-conductive path commensurate in size and shape to at least a portion of said electrically-conductive ring; and
   a reference ring-shaped element in a fixed relationship with respect to said antenna, said reference ring-shaped element including an electrically-conductive reference ring and a reference RFID integrated circuit electrically coupled to said electrically-conductive reference ring.

10. The sensor system of claim 9, wherein said electrically-conductive path is parallel to said ring-shaped element.

11. The sensor system of claim 9, wherein said ring-shaped element is rectangular.

12. The sensor system of claim 9, wherein said antenna is selected from the group consisting of a microstrip patch antenna, a slot antenna, a dipole antenna, and a planar inverted-F antenna.

13. A system for radio frequency identification (RFID)-enabled information collection, comprising:
   a movable support;
   at least one ring-shaped element, each said at least one ring-shaped element including an air electrically-conductive ring and an RFID integrated circuit electrically coupled to said electrically-conductive ring, each said at least one ring-shaped element coupled to said movable support for movement therewith;

a fixed body;

an antenna coupled to said fixed body, said antenna defining an electrically-conductive path commensurate in size and shape to at least a portion of said electrically-conductive ring;

a reference ring-shaped element coupled to said fixed body, said reference ring-shaped element maintained in a fixed relationship with respect to said antenna, said reference ring-shaped element including an electrically-conductive reference ring and a reference RFID integrated circuit electrically coupled to said electrically-conductive reference ring, said reference ring element being positioned to be energized by said electromagnetic energy emanating from said antenna;

interrogator for transmitting a signal to said antenna wherein said electric current is generated along said electrically-conductive path and electromagnetic energy emanates from said antenna, wherein at least one of said at least one ring-shaped element and said RFID integrated circuit associated therewith is energized by said electromagnetic energy, and wherein each said RFID integrated circuit so-energized generates a data transmission to receipt by said interrogator; and a processor coupled to said interrogator to deriving information directed to position of said movable support as related to position of said fixed body using said data transmission.

14. The system of claim 13, wherein said electrically-conductive path is parallel to said plane.

15. The system claim 13, wherein each said at least one ring-shaped element is rectangular.

16. The system of claim 13, wherein said data transmission includes a unique identity for each said RFID integrated circuit.

17. The system of claim 13, wherein said antenna is selected from the group consisting of a microstrip patch antenna, a slot antenna, a dipole antenna, and a planar inverted-F antenna.

18. The system of claim 13, further comprising a spring operatively connected between said movable support and said fixed body, wherein said movable support experiences movement whenever an object with mass is attached thereto.

19. The system of claim 13, wherein said movable support and said fixed body comprise a portion of a product dispenser adapted to store products, and wherein said movable support experiences movement whenever one of the products is removed from said product dispenser.

20. The system of claim 19, further comprising an elastic element coupled to said movable support and to said fixed body for causing said movement of said movable support whenever one of the products is removed from said product dispenser.

21. The system of claim 13, wherein said data transmission includes a received signal strength indication (RSSI).

22. The system of claim 13, wherein said data transmission includes magnitude and phase information associated therewith.

* * * * *